United States Patent
Maniyar et al.

(10) Patent No.: US 11,463,312 B2
(45) Date of Patent: Oct. 4, 2022

(54) SECURE ONBOARDING OF NETWORK DEVICES

(71) Applicant: Cisco Technology, Inc., San Jose, CA (US)

(72) Inventors: Shyamsundar N. Maniyar, San Jose, CA (US); Muninder S. Sambi, Pleasanton, CA (US); Sanjay K. Hooda, Pleasanton, CA (US); Rajeev Kumar, Sunnyvale, CA (US); Kedar S. Karmarkar, San Jose, CA (US); Himanshu Mehra, San Jose, CA (US); Nikhil Sharma, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/248,349

(22) Filed: Jan. 21, 2021

(65) Prior Publication Data
US 2022/0231915 A1 Jul. 21, 2022

(51) Int. Cl.
*H04L 41/08* (2022.01)
*H04L 41/0806* (2022.01)
*H04L 61/5014* (2022.01)
*H04L 61/5076* (2022.01)
*H04L 61/5046* (2022.01)
*H04L 101/668* (2022.01)
*H04L 41/0895* (2022.01)

(52) U.S. Cl.
CPC ...... *H04L 41/0886* (2013.01); *H04L 41/0806* (2013.01); *H04L 61/5014* (2022.05); *H04L 61/5046* (2022.05); *H04L 61/5076* (2022.05); *H04L 41/0895* (2022.05); *H04L 2101/668* (2022.05)

(58) Field of Classification Search
CPC ............... H04L 41/00–32; H04L 61/00–0695
See application file for complete search history.

(56) References Cited

U.S. PATENT DOCUMENTS 6,697,360 B1 * 2/2004 Gai ..................... H04L 41/0886
370/389
8,001,269 B1 * 8/2011 Satapati ............ H04L 29/12028
709/245

(Continued)

OTHER PUBLICATIONS

H. Jang, N. Leelathakul and H. S. Kim, "Hierarchical Self-Configuration of Large-Scale Ethernet Networks," IEEE GLOBECOM 2007—IEEE Global Telecommunications Conference, 2007, pp. 193-197, doi: 10.1109/GLOCOM.2007.44. (Year: 2007).*

(Continued)

*Primary Examiner* — Glenton B Burgess
*Assistant Examiner* — Julian Chang
(74) *Attorney, Agent, or Firm* — Patterson + Sheridan, LLP

(57) ABSTRACT

Techniques for automated configuration are provided. A first device detects a new device connected by one or more new links in a network, and the first device transmits, to a dynamic host configuration protocol (DHCP) server, a request for a first new subnet. The first device then assigns a first address of the first new subnet to a first new interface of the first device. The first device additionally transmits a second address of the first new subnet to the new device, where the new device uses the second address to establish connectivity to the network.

20 Claims, 15 Drawing Sheets

(56) References Cited

U.S. PATENT DOCUMENTS

| | | | |
|---|---|---|---|
| 8,681,695 B1* | 3/2014 | Krishnan | H04L 61/5014 370/395.54 |
| 10,375,193 B2* | 8/2019 | Petronic | H04L 61/2007 |
| 10,498,693 B1* | 12/2019 | Strauss | H04L 61/20 |
| 10,645,020 B1* | 5/2020 | Subramanyam | H04L 41/12 |
| 10,848,423 B1* | 11/2020 | Chen | H04L 45/50 |
| 11,159,366 B1* | 10/2021 | Gawade | H04L 41/0803 |
| 2002/0067725 A1* | 6/2002 | Oguchi | H04L 45/50 370/390 |
| 2003/0053477 A1* | 3/2003 | Kim | H04B 3/54 370/432 |
| 2006/0126611 A1* | 6/2006 | Kelly | H04L 29/12283 370/389 |
| 2006/0248191 A1* | 11/2006 | Hudson | H04L 67/1002 709/226 |
| 2007/0091859 A1* | 4/2007 | Sethi | H04L 61/2084 370/338 |
| 2008/0002683 A1* | 1/2008 | Droux | H04L 45/586 370/389 |
| 2008/0005441 A1* | 1/2008 | Droux | H04L 49/70 710/306 |
| 2008/0155676 A1* | 6/2008 | Johnson | H04L 63/0209 726/13 |
| 2008/0170566 A1* | 7/2008 | Akimoto | H04L 61/2015 370/389 |
| 2008/0198766 A1* | 8/2008 | Ogawa | H04L 61/20 370/254 |
| 2009/0276771 A1* | 11/2009 | Nickolov | H04L 67/1001 718/1 |
| 2009/0327392 A1* | 12/2009 | Tripathi | G06F 15/161 709/201 |
| 2011/0090910 A1* | 4/2011 | Tripathi | H04L 49/90 370/395.1 |
| 2011/0225284 A1* | 9/2011 | Savolainen | H04L 29/12066 709/223 |
| 2011/0238793 A1* | 9/2011 | Bedare | H04L 45/586 709/220 |
| 2011/0292938 A1* | 12/2011 | Harp | H04L 61/2015 370/392 |
| 2012/0020318 A1* | 1/2012 | Naoe | H04W 8/26 370/329 |
| 2013/0003738 A1* | 1/2013 | Koganti | H04L 45/586 370/392 |
| 2013/0024553 A1* | 1/2013 | Mittal | H04L 41/0893 709/222 |
| 2013/0182712 A1* | 7/2013 | Aguayo | H04L 41/12 370/395.53 |
| 2013/0266019 A1* | 10/2013 | Qu | H04L 45/74 370/395.53 |
| 2013/0346531 A1* | 12/2013 | Hummel | H04L 49/70 709/212 |
| 2014/0089503 A1* | 3/2014 | Thyni | H04L 61/1511 709/224 |
| 2014/0254432 A1* | 9/2014 | Jagannathan | H04L 45/583 370/255 |
| 2014/0283099 A1* | 9/2014 | Smith | G06F 11/00 726/26 |
| 2014/0362709 A1* | 12/2014 | Kashyap | H04L 43/04 370/250 |
| 2014/0362866 A1* | 12/2014 | Sone | H04L 45/586 370/401 |
| 2015/0092593 A1* | 4/2015 | Kompella | H04L 49/25 370/254 |
| 2015/0117252 A1* | 4/2015 | Ganesan | H04L 45/02 370/254 |
| 2015/0180717 A1* | 6/2015 | Cui | H04L 61/2015 370/254 |
| 2015/0188770 A1* | 7/2015 | Naiksatam | H04L 45/586 370/254 |
| 2015/0244582 A1* | 8/2015 | Asayag | H04L 41/0843 709/221 |
| 2015/0271014 A1* | 9/2015 | Madama | H04L 41/0893 709/222 |
| 2015/0334045 A1* | 11/2015 | Tremblay | H04L 45/14 709/226 |
| 2016/0021032 A1* | 1/2016 | Maier | H04L 49/70 370/401 |
| 2016/0105392 A1* | 4/2016 | Thakkar | H04L 61/6022 709/220 |
| 2016/0105393 A1* | 4/2016 | Thakkar | H04L 67/10 709/220 |
| 2016/0150043 A1* | 5/2016 | Petronic | H04L 61/2546 709/220 |
| 2016/0182279 A1* | 6/2016 | Gong | H04L 41/12 370/254 |
| 2016/0182336 A1* | 6/2016 | Doctor | H04L 43/12 709/224 |
| 2016/0234257 A1* | 8/2016 | Natrajan | H04L 67/1025 |
| 2016/0255045 A1* | 9/2016 | Kolesnik | H04L 61/5014 709/222 |
| 2016/0337185 A1* | 11/2016 | Hardison | H04L 41/0886 |
| 2016/0344687 A1 | 11/2016 | Rong et al. | |
| 2017/0026335 A1 | 1/2017 | Dhulipala et al. | |
| 2017/0317969 A1* | 11/2017 | Masurekar | H04L 41/12 |
| 2017/0317974 A1* | 11/2017 | Masurekar | H04L 67/2804 |
| 2017/0346692 A1* | 11/2017 | Haapanen | H04L 63/08 |
| 2018/0069754 A1* | 3/2018 | Dasu | H04L 45/64 |
| 2018/0074841 A1* | 3/2018 | Ravenhill | G06F 8/65 |
| 2018/0270109 A1* | 9/2018 | Hollis | H04L 41/0803 |
| 2018/0302289 A1* | 10/2018 | Shen | H04L 41/12 |
| 2019/0089740 A1* | 3/2019 | Hastings | H04L 63/0245 |
| 2019/0149509 A1* | 5/2019 | Albrecht | H04L 67/12 709/223 |
| 2019/0280920 A1* | 9/2019 | Wang | H04L 41/0843 |
| 2019/0319848 A1* | 10/2019 | Johnsen | H04L 49/252 |
| 2019/0379582 A1* | 12/2019 | Johnsen | H04L 45/245 |
| 2019/0379598 A1* | 12/2019 | Johnsen | H04L 45/28 |
| 2019/0387406 A1* | 12/2019 | Goeringer | H04L 67/04 |
| 2020/0014659 A1 | 1/2020 | Chasman et al. | |
| 2020/0044917 A1 | 2/2020 | Peng | |
| 2020/0076685 A1* | 3/2020 | Vaidya | H04L 41/0806 |
| 2020/0092169 A1* | 3/2020 | Ding | H04L 41/0843 |
| 2020/0186494 A1* | 6/2020 | X | H04L 41/0806 |
| 2020/0213150 A1* | 7/2020 | Kini | H04L 45/48 |
| 2020/0252331 A1* | 8/2020 | Singal | H04L 45/245 |
| 2020/0304456 A1* | 9/2020 | Ding | H04L 45/54 |
| 2020/0313759 A1 | 10/2020 | C S et al. | |
| 2020/0314015 A1* | 10/2020 | Mariappan | H04L 41/5025 |
| 2020/0336418 A1* | 10/2020 | Jayaraj | H04L 45/22 |
| 2020/0382471 A1* | 12/2020 | Janakiraman | H04L 61/6013 |
| 2020/0396178 A1* | 12/2020 | Mestery | H04L 49/70 |
| 2020/0403875 A1* | 12/2020 | Rooney | H04W 12/08 |
| 2021/0036983 A1* | 2/2021 | Vadde Makkalla | H04L 12/4683 |
| 2021/0112000 A1* | 4/2021 | Forster | H04L 45/74 |
| 2021/0314388 A1* | 10/2021 | Zhou | H04L 61/20 |
| 2022/0021678 A1* | 1/2022 | Kreger-Stickles | H04L 45/54 |
| 2022/0086040 A1* | 3/2022 | Narayanan | H04L 12/4641 |

OTHER PUBLICATIONS

Cisco, "Configure Link Layer Discovery Protocol (LLDP) Port Settings on a Switch through the Command Line Interface (CLI)," Nov. 16, 2020, 24 pages.

* cited by examiner

SECURE ONBOARDING OF NETWORK DEVICES

TECHNICAL FIELD

Embodiments presented in this disclosure generally relate to network devices. More specifically, embodiments disclosed herein relate to automated and secure onboarding and configuration of network devices.

BACKGROUND

In recent years, network deployments have grown increasingly complex and varied. This is particularly true in cloud deployments. Typically, deployment of network devices (e.g., switches) requires significant manual effort to ensure it can connect to the broader network, that routing tables are updated appropriately, that the new device is configured with an appropriate configuration, and the like. These procedures are inefficient and prone to inaccuracy, particularly at scale. In multi-tier branch networks, there may be hundreds or even thousands of branches. There is a need for automated, secure, and efficient onboarding of network devices in various deployments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
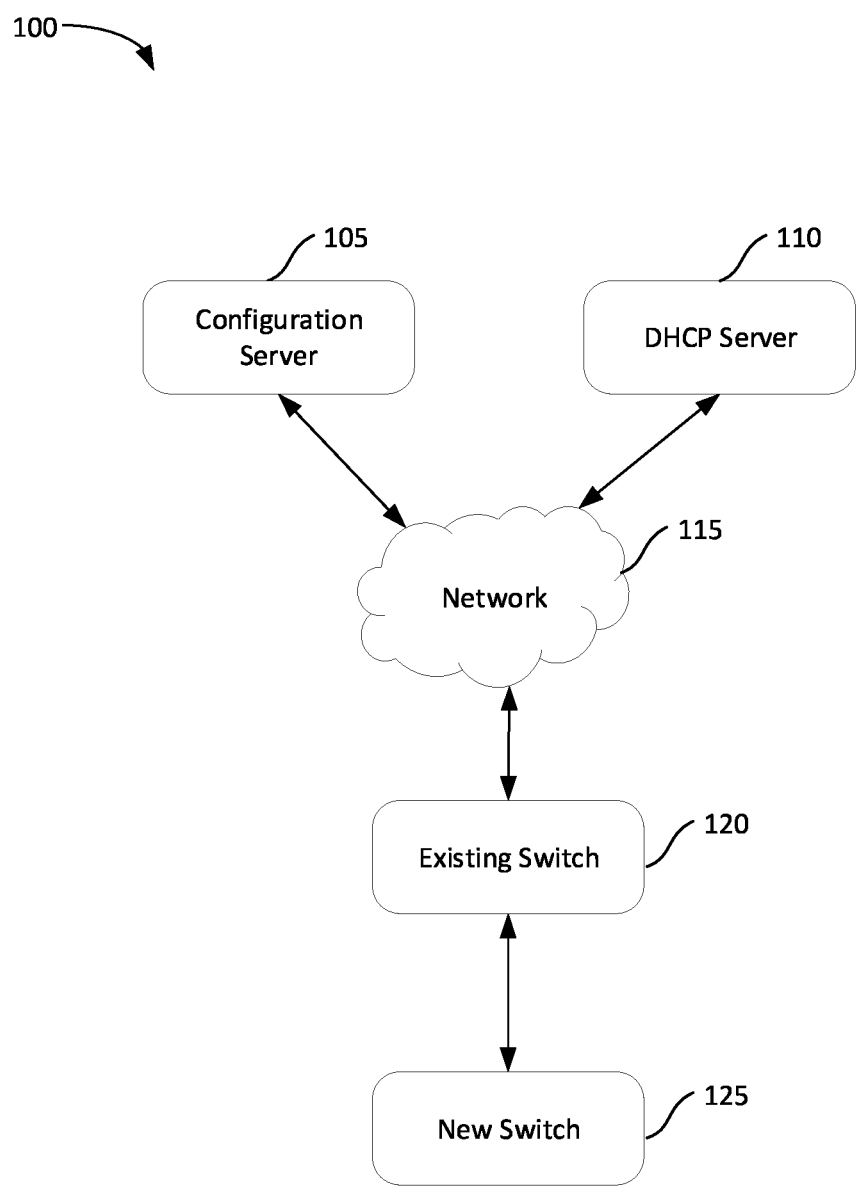
FIG. 1 depicts an environment configured to provide automated device onboarding, according to some embodiments disclosed herein.

According to one embodiment of the present disclosure, a method is provided. The method includes detecting, by a first device, a new device connected by one or more new links in a network; transmitting, by the first device, to a dynamic host configuration protocol (DHCP) server, a request for a first new subnet; assigning, by the first device, a first address of the first new subnet to a first new interface of the first device; and transmitting, by the first device, a second address of the first new subnet to the new device, wherein the new device uses the second address to establish connectivity to the network.

According to one embodiment of the present disclosure, one or more computer-readable storage media are provided. The one or more computer-readable storage media collectively contain computer program code that, when executed by operation of one or more computer processors, performs an operation. The operation includes detecting, by a first device, a new device connected by one or more new links in a network; transmitting, by the first device, to a dynamic host configuration protocol (DHCP) server, a request for a first new subnet; assigning, by the first device, a first address of the first new subnet to a first new interface of the first device; and transmitting, by the first device, a second address of the first new subnet to the new device, wherein the new device uses the second address to establish connectivity to the network.

According to one embodiment of the present disclosure, a system is provided. The system includes one or more computer processors, and one or more memories collectively containing one or more programs which when executed by the one or more computer processors performs an operation. The operation includes detecting, by a first device, a new device connected by one or more new links in a network; transmitting, by the first device, to a dynamic host configuration protocol (DHCP) server, a request for a first new subnet; assigning, by the first device, a first address of the first new subnet to a first new interface of the first device; and transmitting, by the first device, a second address of the first new subnet to the new device, wherein the new device uses the second address to establish connectivity to the network.

Example Embodiments

Embodiments of the present disclosure provide techniques to automatically onboard and/or configure network devices in various deployments. Some embodiments of the present disclosure enable new devices to obtain an address (e.g., an Internet Protocol (IP) address) and update routing knowledge in the network without requiring reconfiguration of the new device or other devices in the network.

In one embodiment, a neighbor discovery protocol can be used to identify newly-connected or activated devices (or new links being added to existing devices). Once such a new link or device is identified, in one embodiment, the existing neighbor device can request a new pool of addresses (e.g., a new subnet) from a dynamic host configuration protocol (DHCP) server. In some embodiments, the requested subnet is a /30 subnet (e.g., a subnet with two IP addresses). In an embodiment, the existing device can then assign one of the addresses in the new subnet to itself (e.g., to the interface facing the new device or link). In some embodiments, the existing device instantiates a lightweight local DHCP server to process discover requests from the new device. When the new switch transmits a DHCP request, the existing device can return another address (or the only other address) in the new subnet.

In at least one embodiment, the new device may set the existing device as its default gateway, enabling it to connect to the broader network. The new device may further request a new configuration and/or routing information from a management or configuration server or device. In an embodiment, this enables the network routing information to be updated with the new device and subnet information. Further, in at least one embodiment, the new device is provided a configuration that matches the configuration of the adjacent existing switch in order to enable rapid and accurate onboarding. Such an automated process can significantly improve the scalability of the network and reduce the resources required to onboard and configure new devices.

FIG. 1 depicts an environment 100 configured to provide automated device onboarding, according to some embodiments disclosed herein. The illustrated environment 100 includes a Configuration Server 105 and a DHCP Server 110, which are communicatively coupled via a Network 115. In embodiments, the Network 115 may include one or more individual networks, including local networks and broader networks such as the Internet. The Network 115 may consist of wired connections, wireless connections, or a combination of wired and wireless connections.

In the illustrated embodiment, an Existing Switch 120 is also coupled to the Network 115, and a New Switch 125 is connected to the Existing Switch 120 in a multi-tier network deployment. In embodiments, the New Switch 125 can access the broader Network 115 (and, therefore, the Configuration Server 105 and the DHCP Server 110) through the Existing Switch 120. In the illustrated environment 100, the New Switch 125 and Existing Switch 120 may utilize an automated onboarding and configuration process described in more detail below.

In one embodiment, during the onboarding process for the New Switch 125, the Existing Switch 120 can request a new subnet from the DHCP Server 110 and assign an address from the new subnet to itself (e.g., to the interface facing the New Switch 125). Another address from the subnet (or the only other address, in the case of a /30 subnet) may be assigned to the New Switch 125 (e.g., to the interface on the New Switch 125 that faces the Existing Switch 120). In this way, the New Switch 125 can automatically establish connectivity to the Network 115.

Using this connection, the New Switch 125 may request any needed updates or configurations from the Configuration Server 105, as well as receive and update the routing information for the deployment. This allows the New Switch 125 to be securely, rapidly, and accurately brought online in the deployment.

In at least one embodiment, if the New Switch 125 is disconnected from the Existing Switch 120, it can automatically reset its configuration to enable it to be re-configured in any new position in the deployment. That is, the New Switch 125 may be automatically configured or re-configured whenever it is connected anywhere in the deployment, enabling rapid scalability. In this way, identical New Switches 125 may be easily deployed and configured throughout the network, where each New Switch 125 receives the appropriate configuration for its respective location in the network.

Although depicted as discrete physical components for conceptual clarity, in embodiments, the Configuration Server 105, DHCP Server 110, Existing Switch 120, and New Switch 125 may be implemented using physical resources virtual resources, or as a combination of the two. Similarly, the operations of each component may be combined or distributed across any number and variety of components.

FIGS. 2A-2E depict a process of automatically onboarding and configuring new network devices, according to some embodiments disclosed herein. Specifically, in the illustrated environment 200A of FIG. 2A, an Existing Switch 120 is communicatively linked with a Configuration Server 105 and a DHCP Server 110 via a Network 115. As discussed above, this Network 115 may include any number and variety of networks, including local networks and the Internet.

Figure 2A:
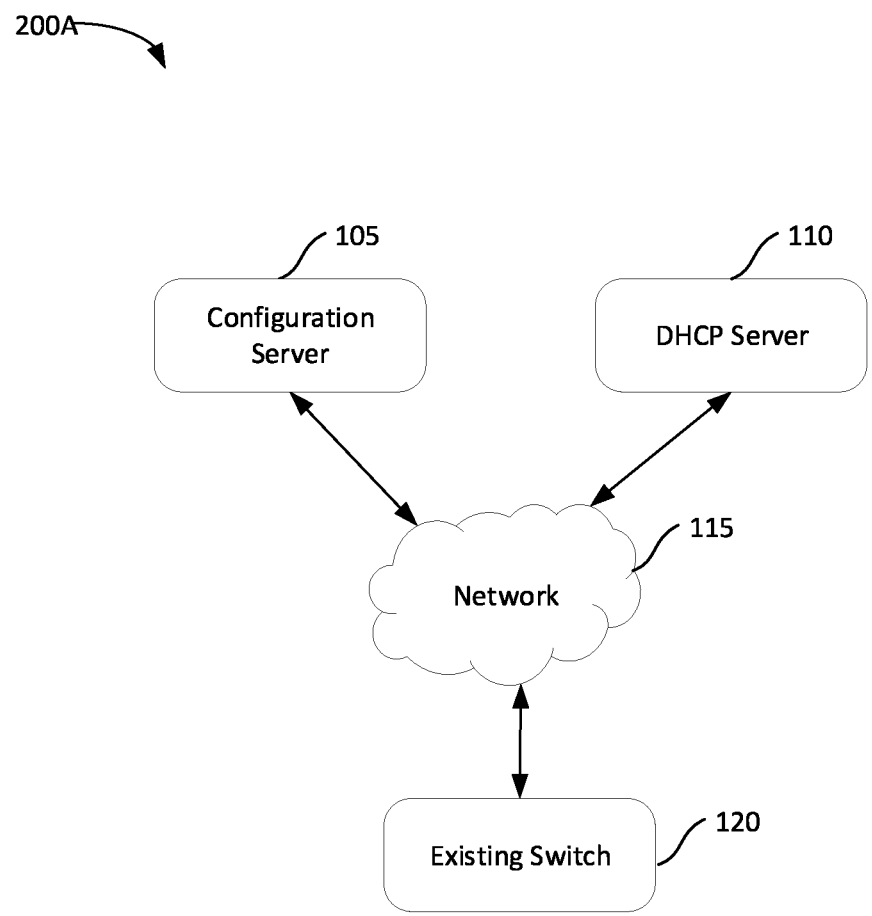
FIGS. 2A-2E depict a process of automatically onboarding and configuring new network devices, according to some embodiments disclosed herein.
Figure 2B:
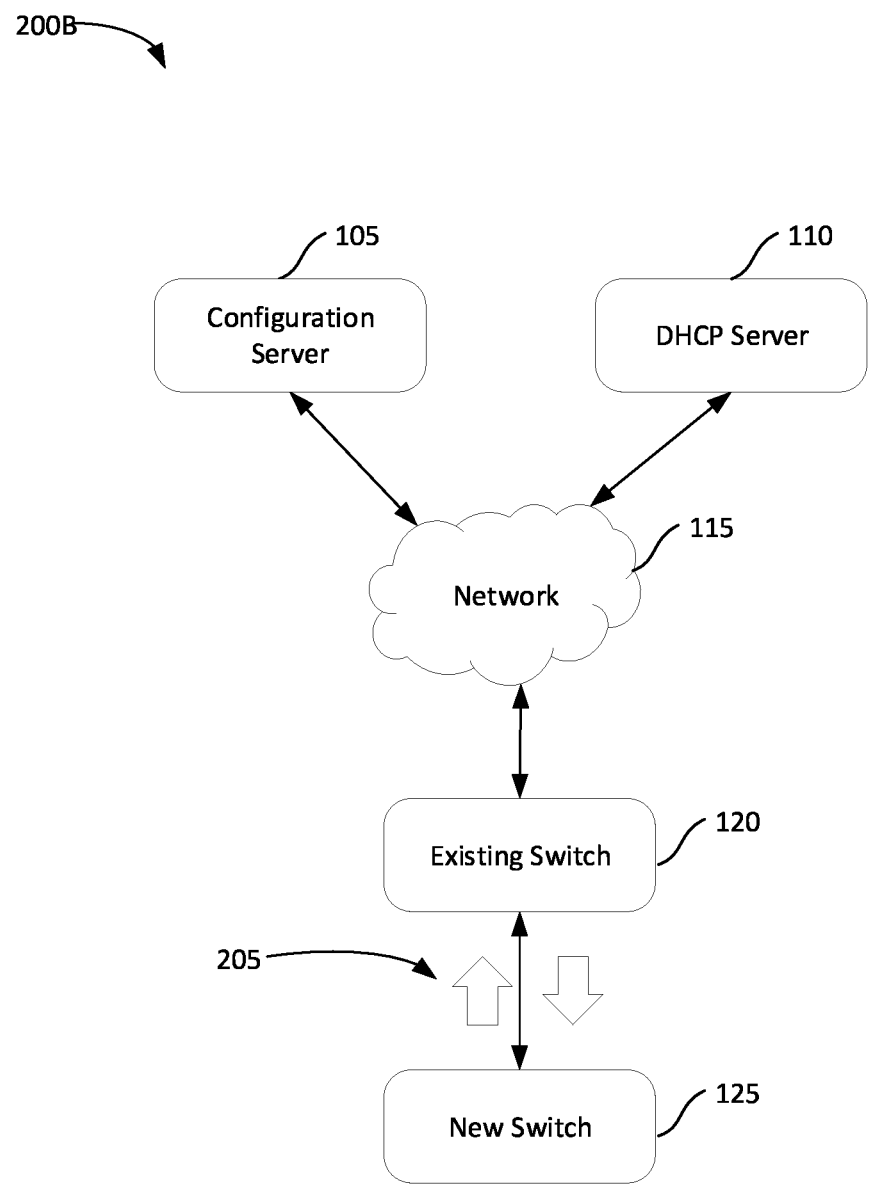

In FIG. 2B, a New Switch 125 has been connected to the Existing Switch 120. This may include, for example, connecting a new device, activating or resetting an already-connected device, adding a new connection or link for an existing device, and the like. As illustrated by arrows 205, the Existing Switch 120 and/or New Switch 125 may discover each other via this new connection. For example, the switches may utilize a neighbor or peer discovery protocol to detect the presence of a new neighboring device. In some embodiments, this discovery also includes identifying a new link (or a link to a new interface of an adjacent device).

Figure 2C:
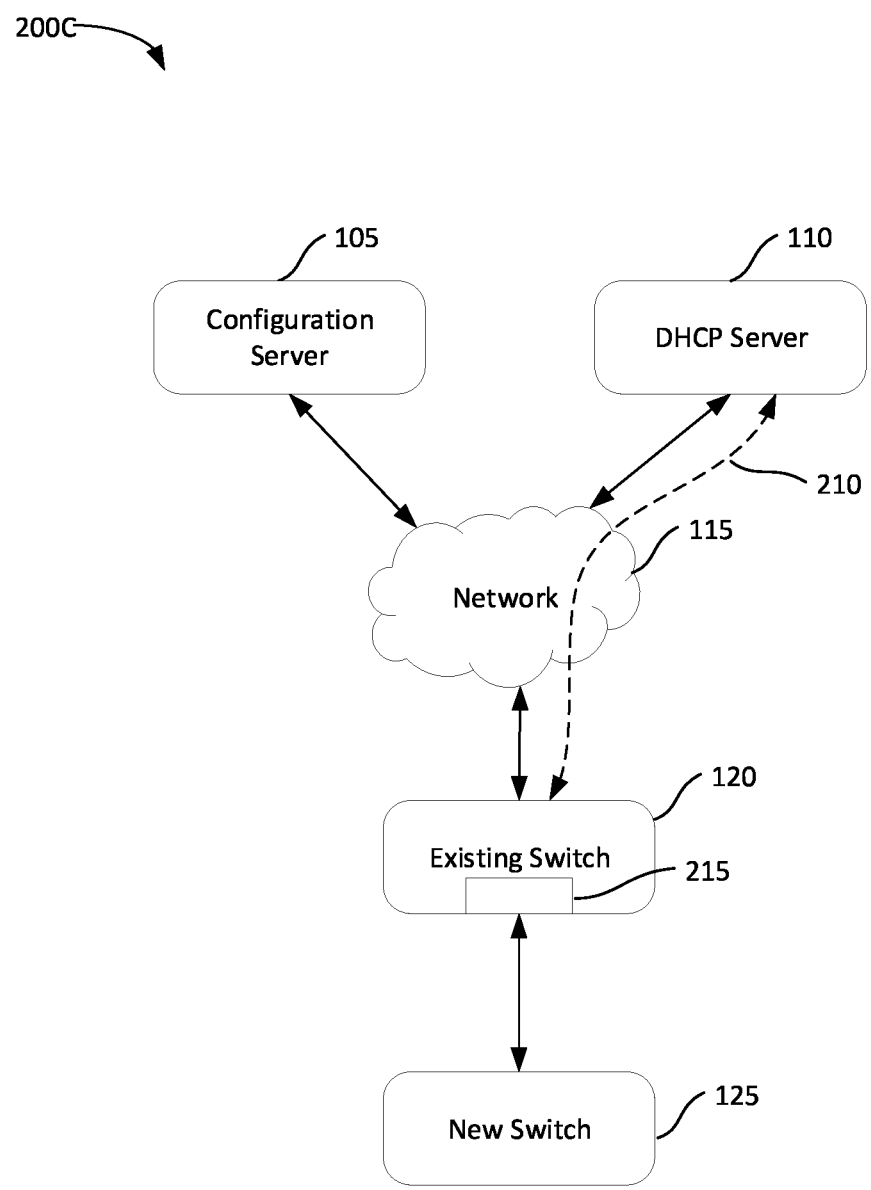

As illustrated in FIG. 2C, upon detecting the New Switch 125, the Existing Switch 120 can generate and transmit a request to the DHC Server 110. This is depicted by the arrow 210, representing the DHCP request and response. In an embodiment, this request is for a new pool of addresses (e.g., a DHCP subnet). In at least one embodiment, the Existing Switch 120 requests a /30 subnet (e.g., a subnet using a 30-bit mask, which allows two hosts to be connected).

As illustrated, the DHCP Server 110 can return a new subnet/pool of addresses based on this DHCP request. For example, the DHCP Server 110 may return a subnet such as 14.14.0.0/30. In the illustrated embodiment, the Existing Switch 120 can use this new subnet to establish a miniature or lightweight DHCP server with a pool corresponding to the new subnet.

In some embodiments, the Existing Switch 120 also configures a new Interface 215 towards the New Switch 125 using this subnet. In one such embodiment, the Existing Switch 120 assigns a first address of the new subnet (e.g., 14.14.0.1/30) to the Interface 215. In at least one embodiment, the Interface 215 is configured using a predefined interface template.

Figure 2D:
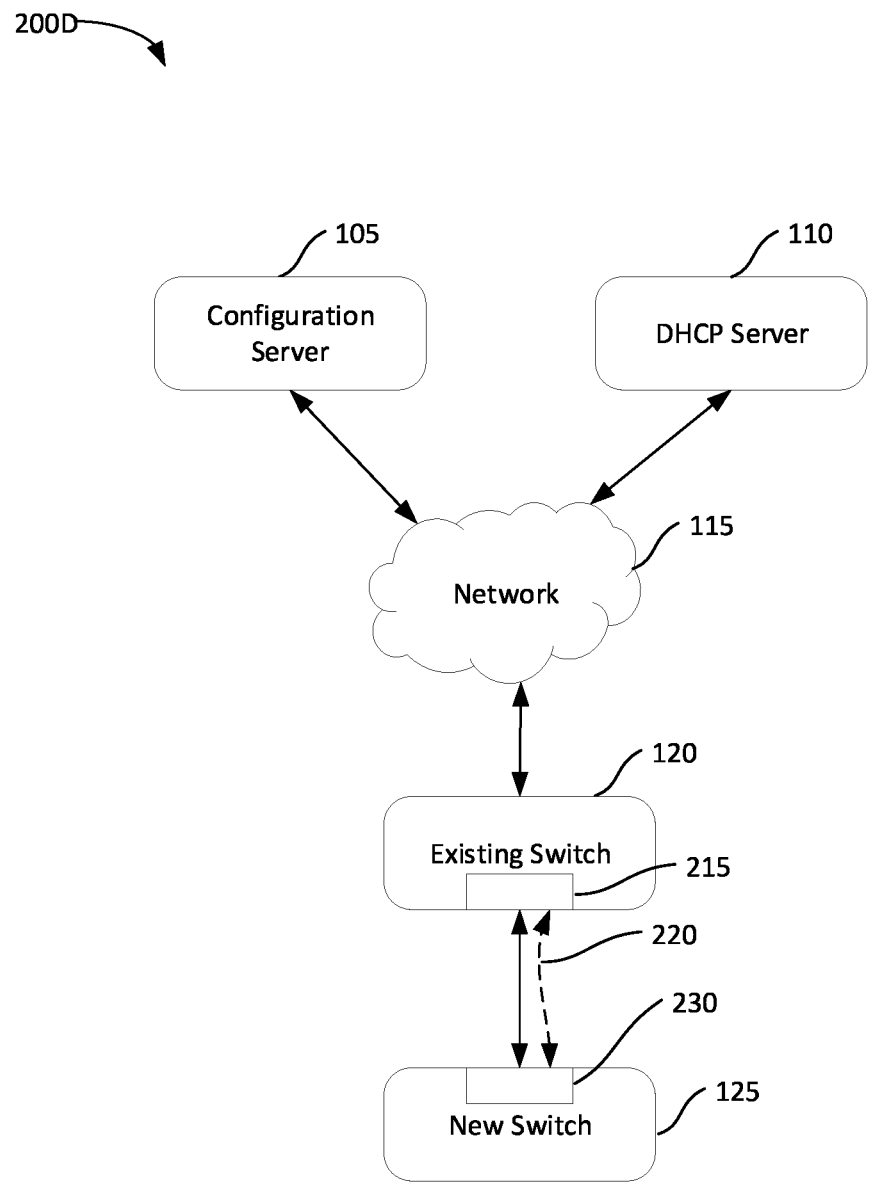

As illustrated in FIG. 2D, the New Switch 125 may then transmit a DHCP request to the Existing Switch 120, requesting an address (e.g., an IP address). In one embodiment, because the New Switch 125 is newly-connected and/or activated, it does not yet have an IP address and cannot communicate via the Network 115. Additionally, the New Switch 125 does not know its position in the deployment, and may not know the location or address of the DHCP Server 110. Thus, the New Switch 125 cannot request an IP address directly from the DHCP Server 110 without manual configuration.

In the illustrated embodiment, therefore, the Existing Switch 120 acts as a lightweight DHCP server and provides, to the New Switch 125 an address from the new subnet (e.g., 14.14.0.2/30). This is depicted by arrow 220, representing the DCHP request and response. The New Switch 125 may assign this address to the new Interface 230 facing the Existing Switch 120. In some embodiments, the Interface 230 is configured based at least in part on an interface template provided by the Existing Switch 120.

In at least one embodiment, the New Switch 125 also sets the Existing Switch 120 as its default gateway (e.g., if IP routing is not available). This allows the New Switch 125 to communicate through the Existing Switch 120 immediately, even if the New Switch 125 does not yet know the topology or routing information for the network.

Figure 2E:
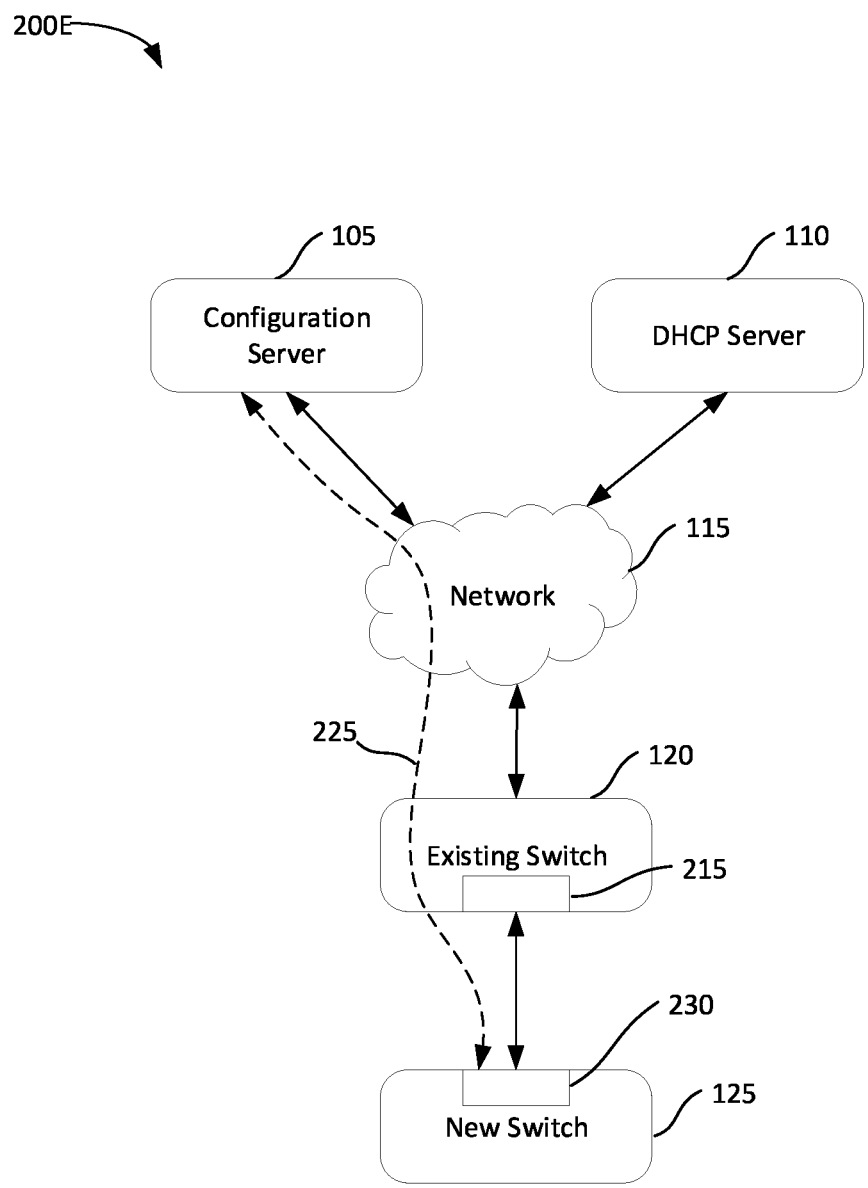

In FIGS. 2E, the New Switch 125 then uses this newly-received address and configured Interface 230 to transmit a request (indicated by arrow 225) to one or more Configuration Servers 105 or other management components for the deployment. In some embodiments, this request includes a request for routing information for the deployment, such that the New Switch 125 can learn how to perform IP routing in the deployment. In at least one embodiment, the request includes an authentication that allows the routing information to be updated to reflect the presence of the New Switch 125.

In some embodiments, the New Switch 125 additionally requests any relevant configurations that are needed. The Configuration Server 105 can determine the appropriate configuration, and return it to the New Switch 125. This may include, for example, the Configuration Server 125 (or some other device) reconfiguring the New Switch 125 based on the configuration, or providing the configuration to the New Switch 125 such that the New Switch 125 can reconfigure itself. In at least one embodiment, to determine the appropriate configuration, the Configuration Server 105 identifies the configuration of the neighboring upstream node (e.g., the Existing Switch 120). The same configuration may be used for the New Switch 125. This allows the New Switch 125 to be automatically configured in accordance with its position in the deployment (e.g., to match the configuration of its branch).

In this way, the system enables New Switches 125 to be automatically, securely, and rapidly brought online and configured without requiring manual intervention. Generally, when an Existing Switch 120 identifies a new neighbor device, this process can be initiated to onboard the new device. Additionally, in some embodiments, the New Switch 125 can automatically reconfigure itself if it is disconnected. For example, if the New Switch 125 is disconnected (and loses its newly acquired address), it can automatically remove the new configuration(s). In this way, if the New Switch 125 is reconnected at the same or in a different location, it can follow the above-described process to reconfigure itself again.

FIGS. 3A-3E depict a process of automatically onboarding and configuring new network links between existing devices, according to some embodiments disclosed herein. In the illustrated embodiment, Existing Switches 120A and 120B are communicatively linked via Interfaces 215 and 220. Additionally, the Existing Switch 120A is communicatively linked to a Configuration Server 105 and a DHCP Server 110 via a Network 115. As discussed above, this Network 115 may include any number and variety of networks, including local networks and the Internet.

In some embodiments, the Existing Switch 120B may have been automatically configured, such as using the process discussed above with reference to FIGS. 2A-2E. As illustrated in FIG. 2B, a new link has been added connecting the Existing Switches 120A and 120B. This may include a new physical link between ports of each device.

As depicted by the arrows 305, the Existing Switches 120A and 120B can use one or more neighbor discovery protocols to detect the presence of its peer. In some embodiments, because the link itself is new, the Existing Switches 120A and 120B may each assume that the peer switch is also a new component.

Figure 3A:
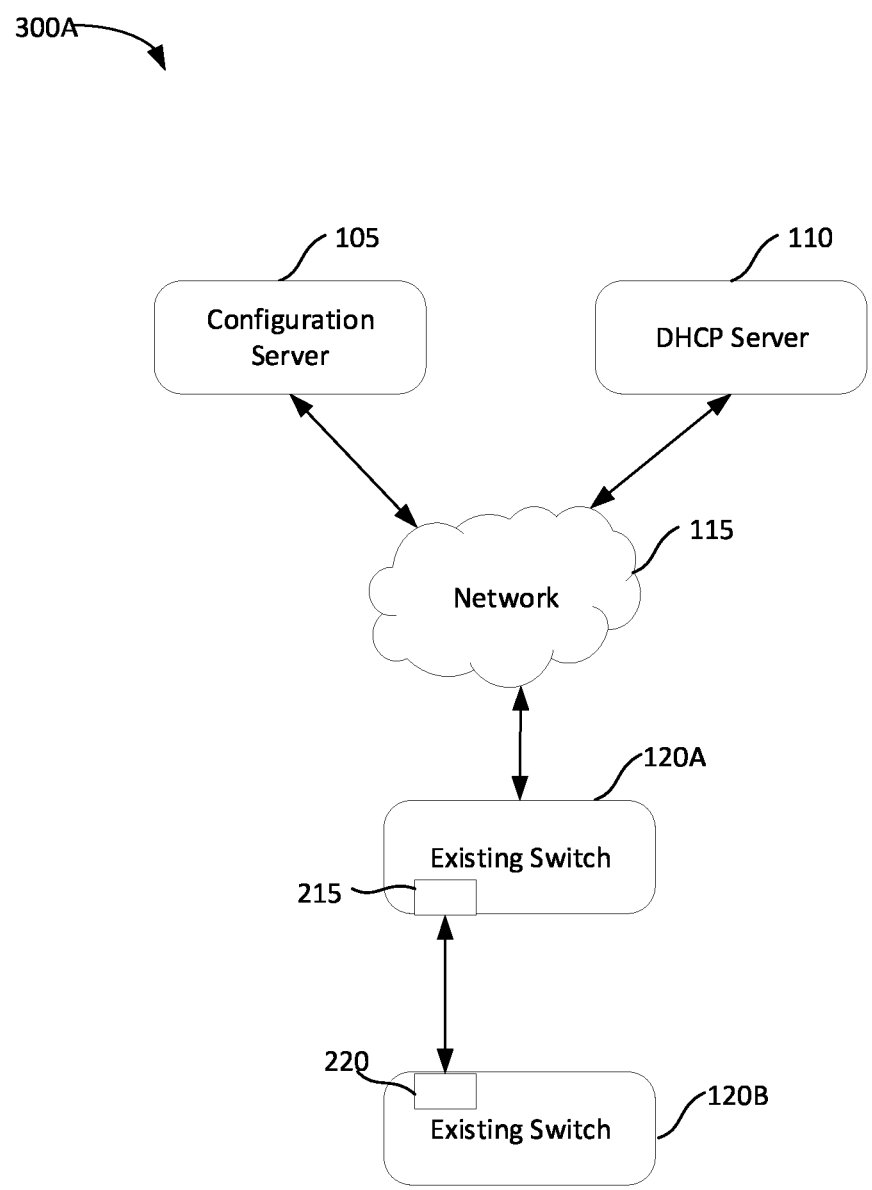
FIGS. 3A-3E depict a process of automatically onboarding and configuring new network links between existing devices, according to some embodiments disclosed herein.
Figure 3B:
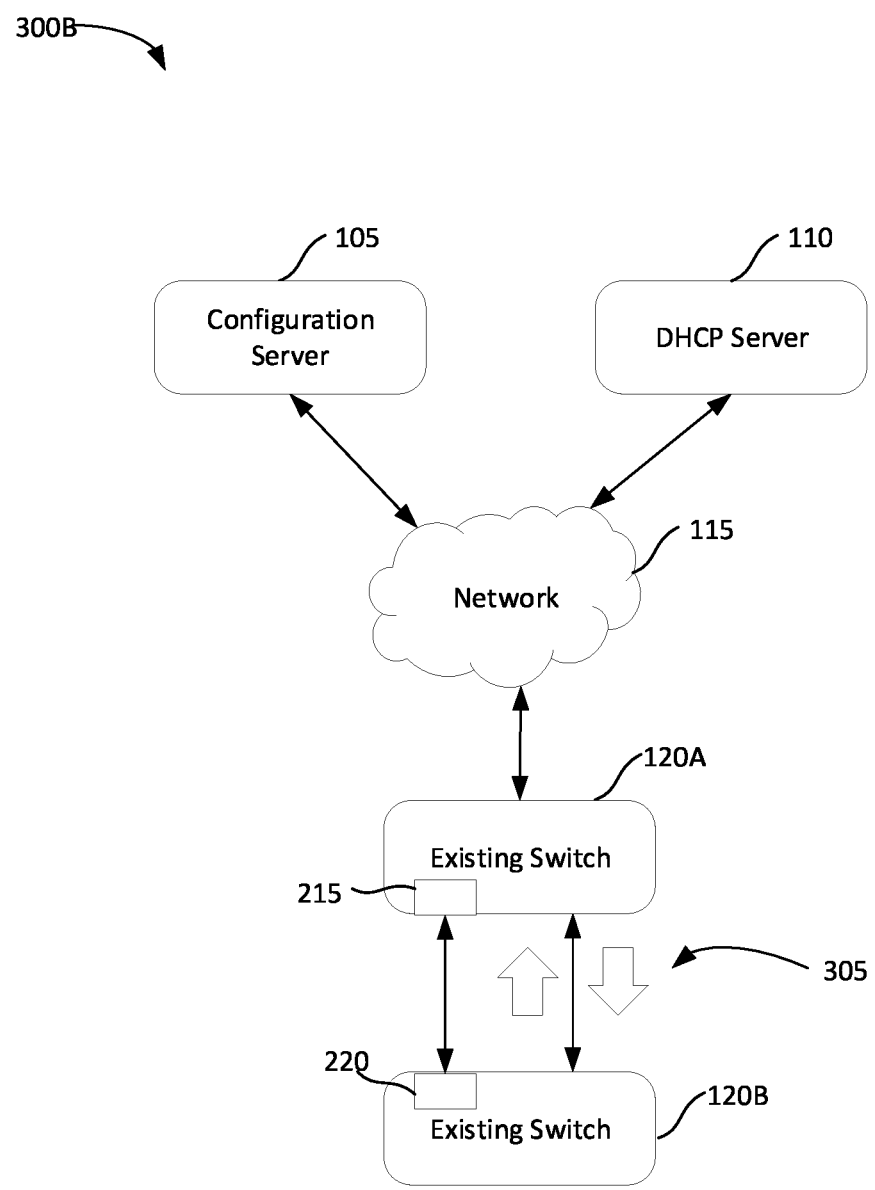
Figure 3C:
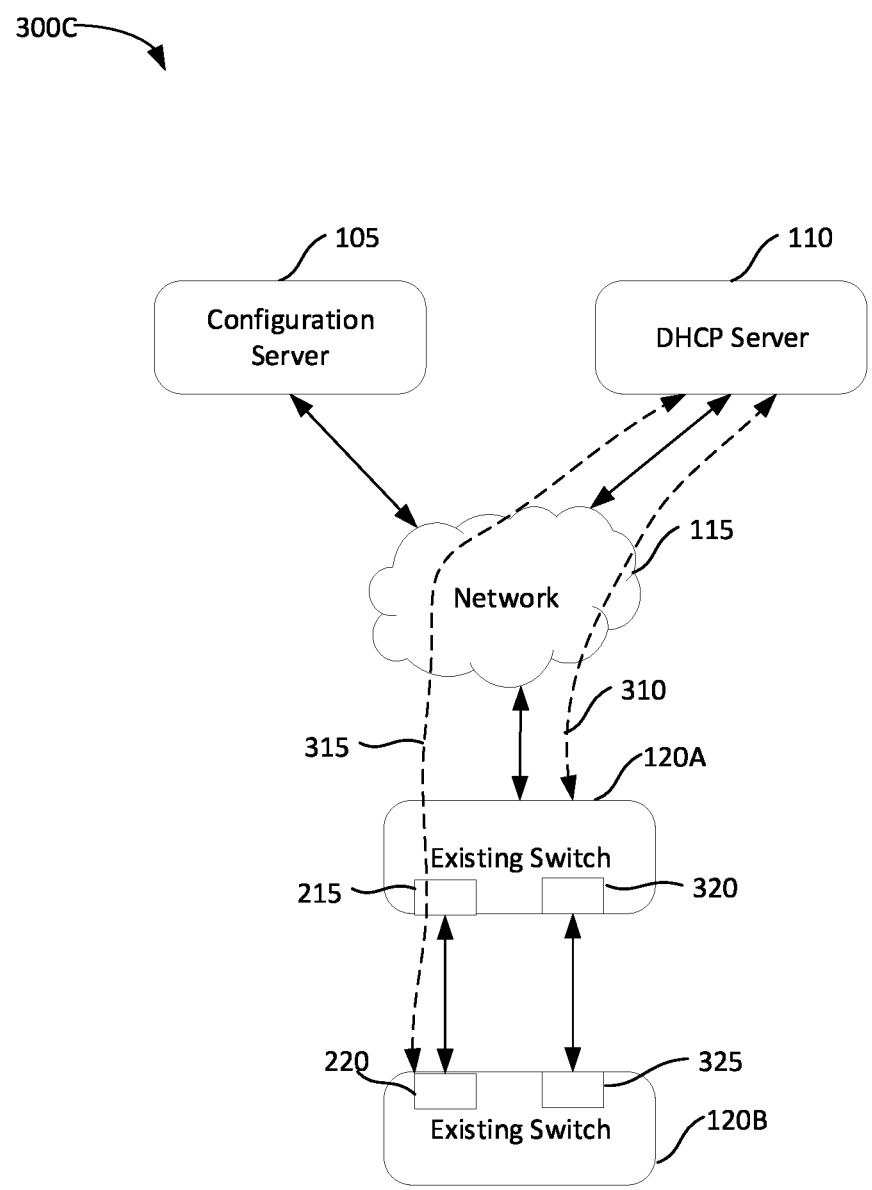

As illustrated in FIG. 3C, therefore, each Existing Switch 120A and 120B may initiate the above-discussed procedures to automatically onboard the new peer. Specifically, as illustrated, the Existing Switch 120A may transmit a DHCP request (indicated by arrow 310) for a new subnet. The DHCP Server 110, in response, returns a new subnet (e.g., 14.14.0.4/30).

As illustrated, the Existing Switch 120A may configure a new local Interface 320 using an address from this new subnet. For example, the Existing Switch 120A may configure the new Interface 320 with address 14.14.0.5/30.

In the illustrated embodiment, the Existing Switch 120B may also transmit a request to the DCHP Server 110 (indicated by arrow 315) for a new subnet. In response, the DHCP Server 110 may return a new subnet (e.g., 14.14.0.8/30). As above, the Existing Switch 120B may then configure its local Interface 325 and assign an address from this new subnet (e.g., address 14.14.0.9/30) to the new Interfaces 325.

Figure 3D:
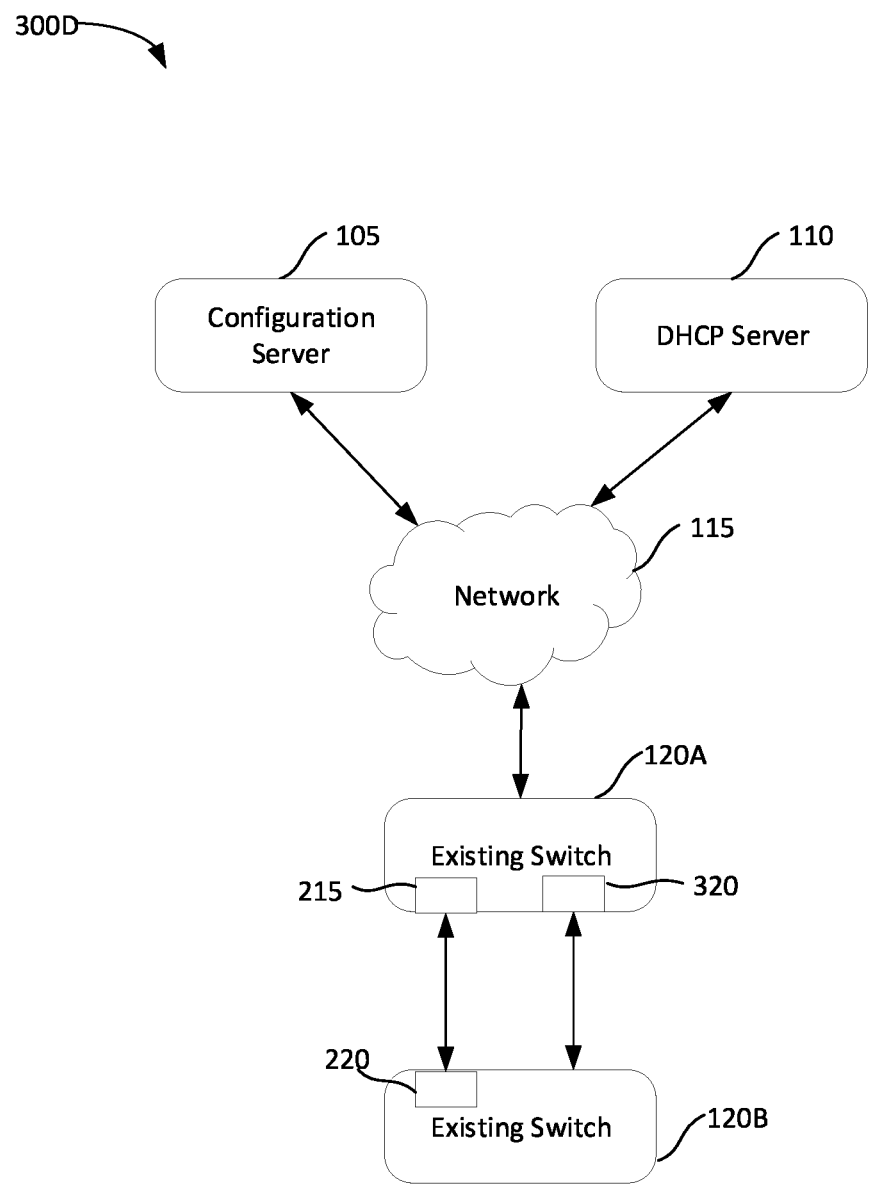

As depicted in FIGS. 3D, in some embodiments, one or both Existing Switches 120A-B may determine that the peer switch has already configured its new Interface 320 or 325 with a new address. That is, because both Existing Switches 120A-B are already connected to the broader Network 115, both may assume they are the only existing switch while the peer is a new switch. Thus, in the illustrated embodiment, one of the Existing Switches 120A or 120B may remove the new subnet and interface in order to follow the procedure discussed above with reference to FIGS. 2A-2E.

In some embodiments, the Existing Switches 120A and 120B can each determine whether to act as the upstream or downstream node (e.g., as the existing device or as a new device) based on the IP address assigned to its local interface and/or the peer interface, based on the hardware address (e.g., a media access control (MAC)) address of its local interface and/or the peer interface, and the like. In at least one embodiment, each Existing Switch 120A-B can determine whether the IP address of the peer device or new interface is within the subnet that was just received.

For example, the Existing Switch 120A may determine whether the IP address of the peer Interface 325 (e.g., 14.14.0.9/30) is within the new subnet received by the Existing Switch 120A (e.g., 14.14.0.4/30). Similarly, the Existing Switch 120B may determine whether the IP address of the peer Interface 320 (e.g., 14.14.0.5/30) is within the new subnet received by the Existing Switch 120B (e.g., 14.14.0.8/30). In the illustrated embodiment, both will determine that it is not.

In response, in one embodiment, the Existing Switches 120A and 120B can each compare the hardware address of their local interface to the hardware address of the peer interface. For example, the Existing Switches 120A-B may each determine whether their local MAC is greater than or less than the peer MAC. In one embodiment, upon determining that the local MAC is less than the peer MAC, the Existing Switch 120 will remove its new configuration and subnet. In FIG. 3D, the Existing Switch 120B has removed its new configuration based on determining that the hardware address of the Interface 325 is less than the hardware address of the peer Interface 320, and that the peer IP address is not within the same subnet.

Figure 3E:
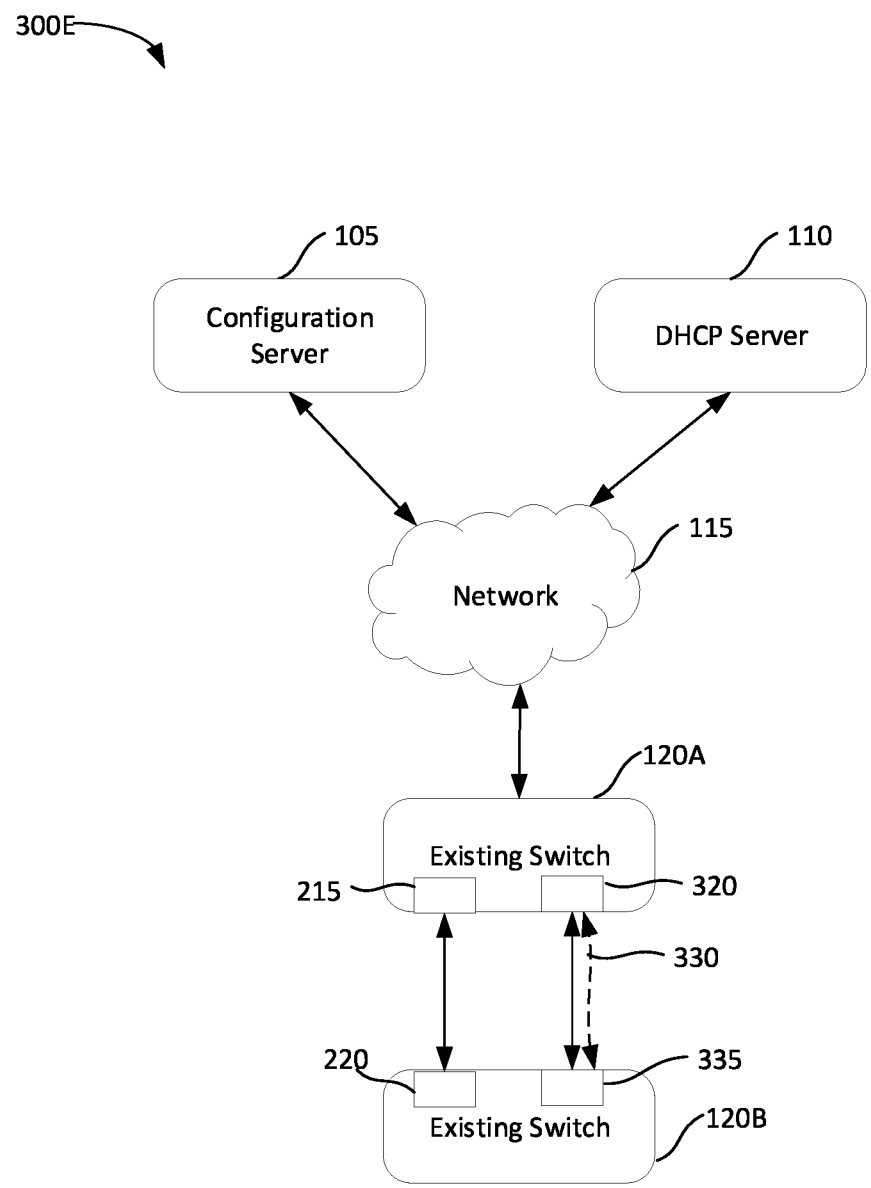

Subsequently, as illustrated in FIG. 3E, the Existing Switch 120B can follow a similar procedure as outlined about to request, from the Existing Switch 120A, a new IP address for the new Interface 335. The Existing Switch 120A, as discussed above, can act as a lightweight DHCP server and provide the other address from the new subnet (e.g., address 14.14.0.6/30) to the Existing Switch 120B. This new address can then be assigned to the new Interface 335 in order to finalize the new link. In at least one embodiment, as discussed above, the Existing Switch 120B may proceed to request updated configuration(s) from the Configuration Server 105.

Figure 4:
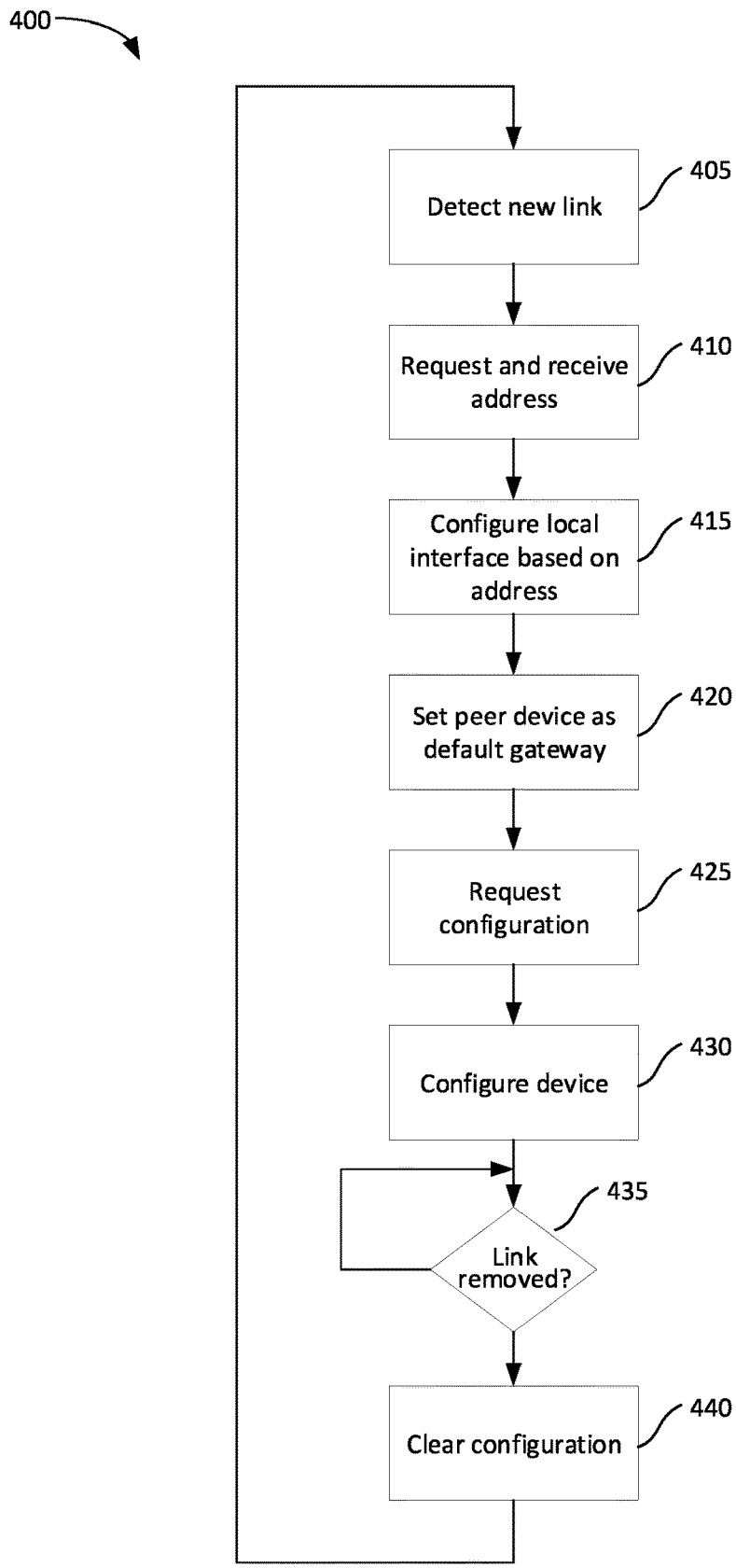
FIG. 4 is a flow diagram illustrating a method for automatically onboarding new network devices from the perspective of the new device, according to some embodiments disclosed herein.

FIG. 4 is a flow diagram illustrating a method 400 for automatically onboarding new network devices from the perspective of the new device, according to some embodiments disclosed herein. The method 400 begins at block 405, when a network device detects a new link and/or a new neighboring device. In some embodiments, this detection is performed using a neighbor discovery protocol. In at least one embodiment, the network device is a new device that has been instantiated, activated, or otherwise connected to the network in a new location without receiving configuration or information about the deployment. For example, the network device may be unaware of the identity or location of the DHCP server, configuration server, routing information, and the like.

At block 410, the network device requests and receives a new address (e.g., an IP address) from its newly-connected neighbor. As discussed above, in an embodiment, the neighbor device may act as a lightweight DHCP server using a newly-acquired subnet (e.g., a /30 subnet with two addresses). At block 415, the network device can configure its local interface based at least in part on the newly-received address (e.g., by assigning the new address to its local interface that faces the peer device).

The method 400 then continues to block 420, where the network device sets the peer device as its default gateway. In this way, the network device can communicate with other devices and with the broader network even without understanding the routing information for the network. At block 425, via the new link, the network device requests an updated configuration. For example, the network device may request that a configuration server provide routing information, device configurations, and the like.

At block 430, the network device is configured using this updated configuration. In at least one embodiment, the configuration server returns a configuration that matches the configuration of the identified peer device. The method 400 then continues to block 435.

At block 435, the network device determines whether the new link has been removed. That is, the network device can determine whether it has been disconnected (e.g., because it is being moved to a new position in the network). If not, the method 400 iterates at block 435.

If the link has been removed, the method 400 continues to block 440 where the network device clears its new configuration. This readies the network device to be repositioning in a new place in the network, and allows it to automatically configure itself for the new location without requiring any manual intervention or configuration. The method 400 then returns to block 405 when the network device detects its new link or connection.

Figure 5:
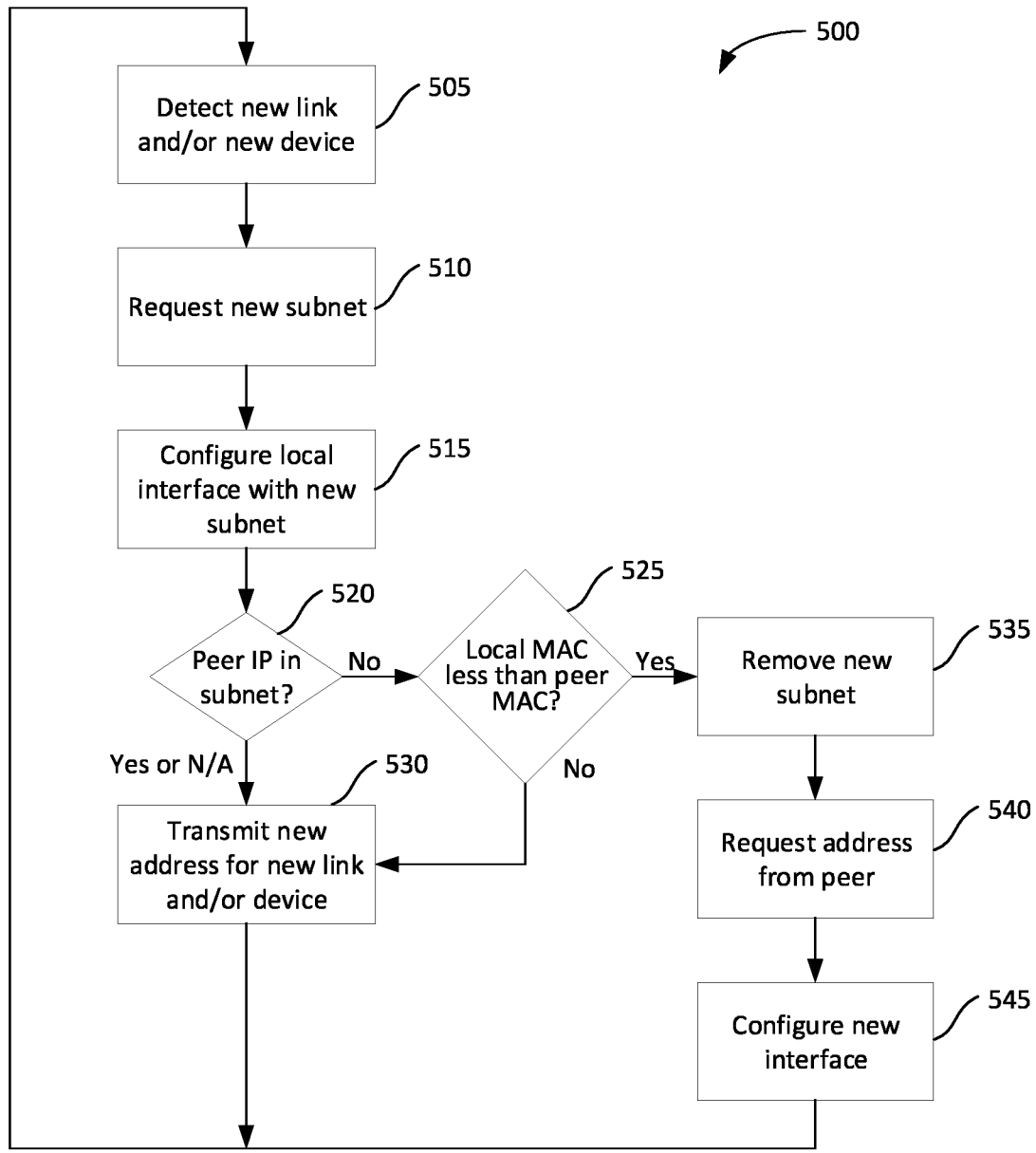
FIG. 5 is a flow diagram illustrating a method for automatically onboarding new network devices from the perspective of the existing device, according to some embodiments disclosed herein.

FIG. 5 is a flow diagram illustrating a method 500 for automatically onboarding new network devices from the perspective of the existing device, according to some embodiments disclosed herein. The method 500 begins at block 505, where an existing network device detects the presence of a new device and/or new link. In some embodiments, as discussed above, the network device does so using one or more neighbor discovery protocols.

At block 510, the network device requests a new subnet (e.g., from a DHCP server). That is, the network device may determine that it is configured and has connectivity to the DHCP server for the deployment, and therefore determine that it should request a new subnet (with the assumption that the peer device may not have such connectivity).

The method 500 then continues to block 515, where the network device configures a new local interface based on the newly-received subnet. For example, the network device may assign one address from the new subnet to its local interface that faces the newly-identified device or link. At block 520, the network device then determines whether the peer IP is within this newly-received subnet.

As discussed above, if the neighbor device also has connectivity, it may also request its own new subnet and assign an address to the interface that faces the network device. If, at block 520, the network device determines that the peer IP is within the same subnet or that the peer device does not have an IP (e.g., because the peer device is a new device with no connectivity), the method 500 continues to block 530.

At block 530, the network device transmits a new address from the newly-acquired subnet to the peer device. This new address can be assigned to the interface of the new device that faces the network device. In this way, the neighbor device can communicate with the broader network via the new link.

Returning to block 520, if the network device determines that the peer IP is not within the same subnet, the method 500 continues to block 525. At block 525, the network device determines whether the local hardware address is less than the peer hardware address. If not, the method 500 continues to block 530 discussed above. That is, the network device can act as the upstream or "existing" device in this connection.

If the network device determines that the local hardware address is less than the peer address, the method 500 continues to block 535, where the network device removes its newly-acquired subnet and clears the configuration of the new interface that faces the peer device. That is, the network device acts as the downstream or "new" device in this connection.

At block 540, the network device requests an IP address from the neighbor device, as discussed above. The neighbor device, acting as a lightweight DHCP server, can return a new address. At block 545, the network device then assigns this new address to the local interface facing the peer device. The method 500 then returns to block 505 to begin anew when a new connection is identified.

Figure 6:
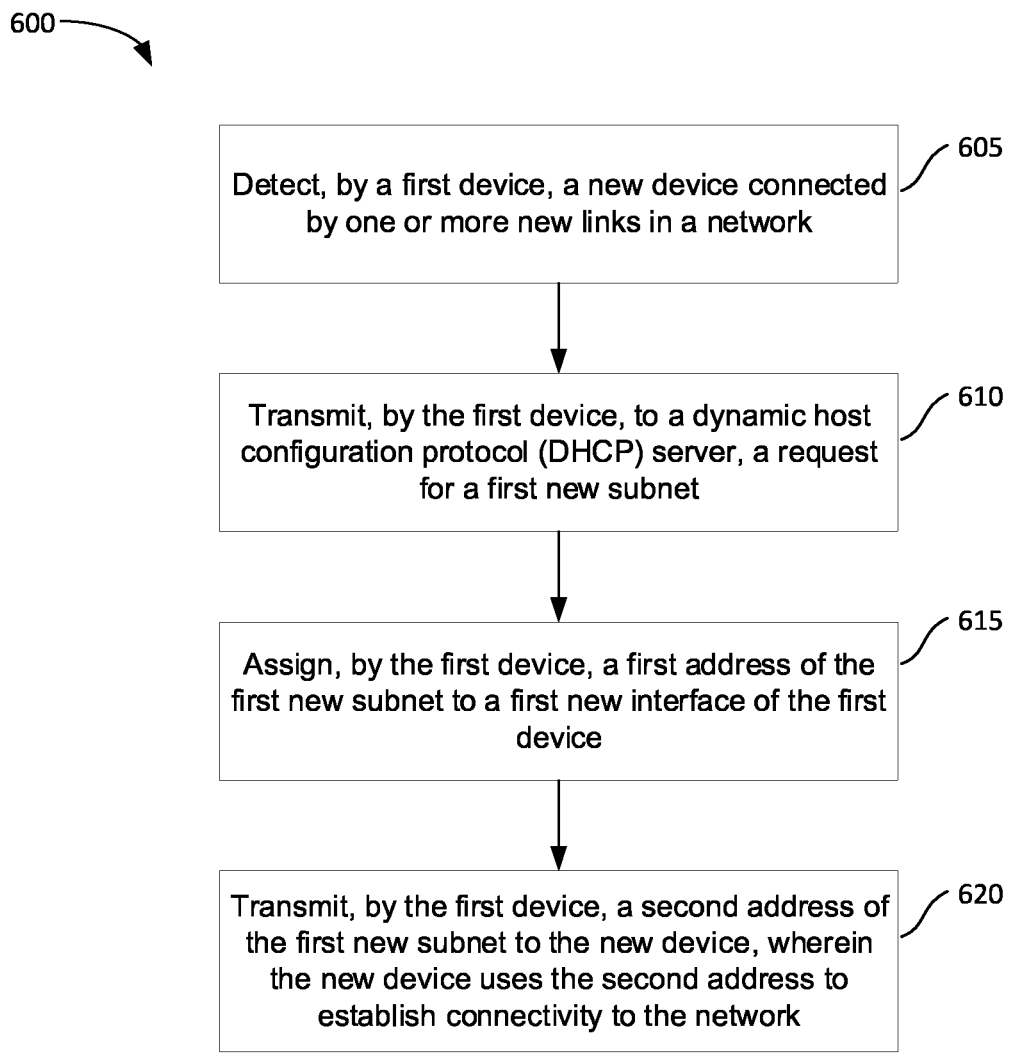
FIG. 6 is a flow diagram illustrating a method for automatically onboarding network devices, according to some embodiments disclosed herein.

FIG. 6 is a flow diagram illustrating a method 600 for automatically onboarding network devices, according to some embodiments disclosed herein. The method 600 begins at block 605, where a network device detects a new device connected by one or more new links in a network.

At block 610, the network device transmits, to a dynamic host configuration protocol (DHCP) server, a request for a first new subnet.

The method 600 then continues to block 615, where the network device assigns a first address of the first new subnet to a first new interface of the network device.

Further, at block 620, the network device transmits a second address of the first new subnet to the new device, wherein the new device uses the second address to establish connectivity to the network. In some embodiments, the new device sets the first device as a default gateway for the new device.

In some embodiments, the network device can also configure the first new interface of the network device based on an interface template, and transmit the interface template to the new device. The new device can then configure a first new interface of the new device based on the interface template.

In some embodiments, the new device can also transmit a request for an updated configuration to a configuration server, and receive, from the configuration server, the updated configuration, wherein the configuration server selects the updated configuration based on determining that the first device uses the updated configuration.

In at least one embodiment, upon determining, that the new device has been disconnected from the first device, the new device can automatically remove the updated configuration from the new device.

In some embodiments, the method can further include determining, by the new device, that a new link has been added connecting the first device and the new device. The method may further include transmitting, by the new device, to the DHCP server, a request for a second new subnet. The method may also include assigning, by the new device, a first address of the second new subnet to a first new interface of the new device. Upon determining, by the new device, that an address of the network device is not within the second new subnet, the new device may also transmit a request, to the network device, for an address for the first new interface of the new device.

In at least one embodiment, the new device transmits the request for an address for the first new interface of the new device upon further determining that a hardware address of the network device is greater than a hardware address of the new device.

In some embodiments, the method also includes transmitting, by the network device, to the DHCP server, a request for a third new subnet, and assigning, by the network device, a first address of the third new subnet to a second new interface of the network device. The network device may then transmit a second address of the third new subnet to the new device.

Figure 7:
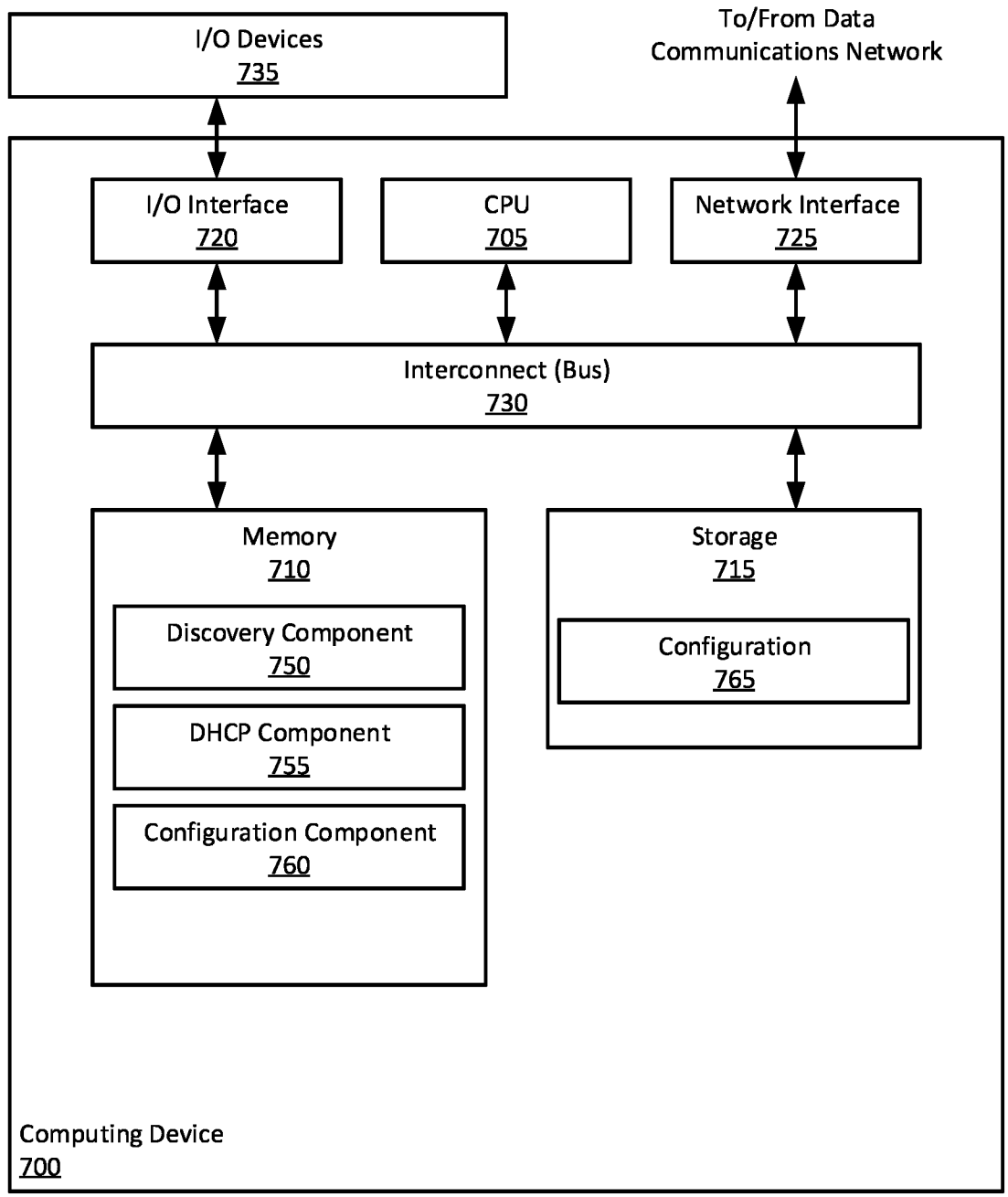
FIG. 7 is a block diagram illustrating a computing device configured to automatically onboard network devices, according to some embodiments disclosed herein.

FIG. 7 is a block diagram illustrating a Computing Device 700 configured to automatically onboard network devices, according to some embodiments disclosed herein. Although depicted as a physical device, in embodiments, the Computing Device 700 may be implemented using virtual device(s), and/or across a number of devices (e.g., in a cloud environment). As illustrated, the Computing Device 700 includes a CPU 705, Memory 710, Storage 715, a Network Interface 725, and one or more I/O Interfaces 720. In the illustrated embodiment, the CPU 705 retrieves and executes programming instructions stored in Memory 710, as well as stores and retrieves application data residing in Storage 715. The CPU 705 is generally representative of a single CPU and/or GPU, multiple CPUs and/or GPUs, a single CPU and/or GPU having multiple processing cores, and the like. The Memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 735 (such as keyboards, monitors, etc.) are connected via the I/O Interface(s) 720. Further, via the Network Interface 725, the Computing Device 700 can be communicatively coupled with one or more other devices and components (e.g., via a network, which may include the Internet, local network(s), and the like). As illustrated, the CPU 705, Memory 710, Storage 715, Network Interface(s) 725, and I/O Interface(s) 720 are communicatively coupled by one or more Buses 730.

In the illustrated embodiment, the Storage 715 includes a set of one or more Configurations 765. Although depicted as residing in Storage 715, in embodiments, the Configuration 765 may reside in any suitable location. In one embodiment, the Configuration 765 is automatically requested and received by the Computing Device 700 to enable it to configure itself in accordance with its position in the network, as discussed above.

In the illustrated embodiment, the Memory 710 includes a Discovery Component 750, DHCP Component 755, and Configuration Component 760. Although depicted as software residing in Memory 710, in embodiments, the functionality of the Discovery Component 750, DHCP Component 755, and Configuration Component 760 may be implemented using software, hardware, or a combination of software and hardware. Additionally, though illustrated using discrete components for conceptual clarity, in embodiments, the operations of the Discovery Component 750, DHCP Component 755, and Configuration Component 760 may be combined or distributed across any number of components.

In one embodiment, the Discovery Component 750 is used to discovery, identify, or otherwise detect, neighbor devices (also referred to as peer devices). In some embodiments, the Discovery Component 750 does so using a neighbor discovery protocol. Upon detecting a new neighbor (or a new link), one or more processes described above may be instantiated.

In an embodiment, the DHCP Component 755 can request new subnets (e.g., from a DHCP server) upon determining that a new device or link is present. In some embodiments, the DHCP Component 755 also instantiates a local DHCP server in order to provide address(es) to newly connected devices or links, as discussed above.

In an embodiment, the Configuration Component 760 may configure local interfaces of the Computing Device 700, as discussed above. In some embodiments, the Configuration Component 760 does so using an interface template. This template may be stored locally, and/or may be received from an adjacent device (e.g., when the Computing Device 700 was initially activated). In some embodiments, the Configuration Component 760 also requests configurations and routing information for the deployment, and uses this information to automatically reconfigure itself as needed.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   detecting, by a first switch, a new switch connected by one or more new links in a network;
   in response to detecting the new switch:
      transmitting, by the first switch, to a dynamic host configuration protocol (DHCP) server, a request for a first new subnet to be used to connect the first switch and the new switch;
      configuring, by the first switch, a first new interface of the first switch, wherein the first new interface faces the new switch; and
      assigning, by the first switch, a first address of the first new subnet to the first new interface of the first switch; and
   in response to receiving, by the first switch and from the new switch, a request for an address:
      transmitting, by the first switch, a second address of the first new subnet to the new switch, wherein the new switch uses the second address to establish connectivity to the network via the first switch.

2. The method of claim 1, further comprising:
   configuring the first new interface of the first switch based on an interface template; and
   transmitting, by the first switch, the interface template to the new switch, wherein the new switch configures a first new interface of the new switch based on the interface template.

3. The method of claim 1, further comprising:
   setting, by the new switch, the first switch as a default gateway for the new switch.

4. The method of claim 1, further comprising:
   transmitting, by the new switch, a request for an updated configuration to a configuration server; and
   receiving, from the configuration server, the updated configuration, wherein the configuration server selects the updated configuration based on determining that the first switch uses the updated configuration.

5. The method of claim 4, further comprising:
upon determining, by the new switch, that the new switch has been disconnected from the first switch:
automatically removing the updated configuration from the new switch.

6. The method of claim 1, further comprising:
determining, by the new switch, that a new link has been added connecting the first switch and the new switch;
transmitting, by the new switch, to the DHCP server, a request for a second new subnet;
assigning, by the new switch, a first address of the second new subnet to a first new interface of the new switch; and
upon determining, by the new switch, that an address of the first switch is not within the second new subnet, transmitting a request, to the first switch, for an address for the first new interface of the new switch.

7. The method of claim 6, wherein the new switch transmits the request for an address for the first new interface of the new switch upon further determining that a hardware address of the first switch is greater than a hardware address of the new switch.

8. The method of claim 6, further comprising:
transmitting, by the first switch, to the DHCP server, a request for a third new subnet;
assigning, by the first switch, a first address of the third new subnet to a second new interface of the first switch; and
transmitting, by the first switch, a second address of the third new subnet to the new switch.

9. One or more non-transitory computer-readable storage media collectively containing computer program code that, when executed by operation of one or more computer processors, performs an operation comprising:
detecting, by a first switch, a new switch connected by one or more new links in a network;
in response to detecting the new switch:
transmitting, by the first switch, to a dynamic host configuration protocol (DHCP) server, a request for a first new subnet to be used to connect the first switch and the new switch;
configuring, by the first switch, a first new interface of the first switch, wherein the first new interface faces the new switch; and
assigning, by the first switch, a first address of the first new subnet to the first new interface of the first switch; and
in response to receiving, by the first switch and from the new switch, a request for an address:
transmitting, by the first switch, a second address of the first new subnet to the new switch, wherein the new switch uses the second address to establish connectivity to the network via the first switch.

10. The non-transitory computer-readable storage media of claim 9, the operation further comprising:
configuring the first new interface of the first switch based on an interface template; and
transmitting, by the first switch, the interface template to the new switch, wherein the new switch configures a first new interface of the new switch based on the interface template.

11. The non-transitory computer-readable storage media of claim 9, the operation further comprising:
setting, by the new switch, the first switch as a default gateway for the new switch.

12. The non-transitory computer-readable storage media of claim 9, the operation further comprising:
transmitting, by the new switch, a request for an updated configuration to a configuration server; and
receiving, from the configuration server, the updated configuration, wherein the configuration server selects the updated configuration based on determining that the first switch uses the updated configuration.

13. The non-transitory computer-readable storage media of claim 9, the operation further comprising:
determining, by the new switch, that a new link has been added connecting the first switch and the new switch;
transmitting, by the new switch, to the DHCP server, a request for a second new subnet;
assigning, by the new switch, a first address of the second new subnet to a first new interface of the new switch; and
upon determining, by the new switch, that an address of the first switch is not within the second new subnet, transmitting a request, to the first switch, for an address for the first new interface of the new switch.

14. The non-transitory computer-readable storage media of claim 13, the operation further comprising:
transmitting, by the first switch, to the DHCP server, a request for a third new subnet;
assigning, by the first switch, a first address of the third new subnet to a second new interface of the first switch; and
transmitting, by the first switch, a second address of the third new subnet to the new switch.

15. A system comprising:
one or more computer processors; and
one or more memories collectively containing one or more programs which when executed by the one or more computer processors performs an operation, the operation comprising:
detecting, by a first switch , a new switch connected by one or more new links in a network;
in response to detecting the new switch;
transmitting, by the first switch, to a dynamic host configuration protocol (DHCP) server, a request for a first new subnet to be used to connect the first switch and the new switch;
configuring, by the first switch, a first new interface of the first switch, wherein the first new interface faces the new switch; and
assigning, by the first switch, a first address of the first new subnet to the first new interface of the first switch; and
in response to receiving, by the first switch and from the new switch, a request for an address:
transmitting, by the first switch, a second address of the first new subnet to the new switch, wherein the new switch uses the second address to establish connectivity to the network via the first switch.

16. The system of claim 15, the operation further comprising:
configuring the first new interface of the first switch based on an interface template; and
transmitting, by the first switch, the interface template to the new switch, wherein the new switch configures a first new interface of the new switch based on the interface template.

17. The system of claim 15, the operation further comprising:
setting, by the new switch, the first switch as a default gateway for the new switch.

18. The system of claim 15, the operation further comprising:
- transmitting, by the new switch, a request for an updated configuration to a configuration server; and
- receiving, from the configuration server, the updated configuration, wherein the configuration server selects the updated configuration based on determining that the first switch uses the updated configuration.

19. The system of claim 15, the operation further comprising:
- determining, by the new switch, that a new link has been added connecting the first switch and the new switch;
- transmitting, by the new switch, to the DHCP server, a request for a second new subnet;
- assigning, by the new switch, a first address of the second new subnet to a first new interface of the new switch; and
- upon determining, by the new switch, that an address of the first switch is not within the second new subnet, transmitting a request, to the first switch, for an address for the first new interface of the new switch.

20. The system of claim 19, the operation further comprising:
- transmitting, by the first switch, to the DHCP server, a request for a third new subnet;
- assigning, by the first switch, a first address of the third new subnet to a second new interface of the first switch; and
- transmitting, by the first switch, a second address of the third new subnet to the new switch.

* * * * *

UNITED STATES PATENT AND TRADEMARK OFFICE
CERTIFICATE OF CORRECTION

PATENT NO. : 11,463,312 B2
APPLICATION NO. : 17/248349
DATED : October 4, 2022
INVENTOR(S) : Shyamsundar N. Maniyar et al.

Page 1 of 1

It is certified that error appears in the above-identified patent and that said Letters Patent is hereby corrected as shown below:

In the Claims

In Column 14, Line 37, in Claim 15, delete "switch ," and insert -- switch, --.

In Column 14, Line 39, in Claim 15, delete "switch;" and insert -- switch: --.

Signed and Sealed this
Sixth Day of December, 2022

Katherine Kelly Vidal
*Director of the United States Patent and Trademark Office*